US012561475B2

(12) United States Patent
Du et al.

(10) Patent No.: US 12,561,475 B2
(45) Date of Patent: *Feb. 24, 2026

(54) PROTECTING MEMBERSHIP FOR SECURE COMPUTATION AND COMMUNICATION

(71) Applicant: Lemon Inc., Grand Cayman (KY)

(72) Inventors: Jian Du, Culver City, CA (US); Bo Jiang, Culver City, CA (US); Haohao Qian, Beijing (CN); Qiang Yan, Beijing (CN)

(73) Assignee: Lemon Inc., Grand Cayman (KY)

( * ) Notice: Subject to any disclaimer, the term of this patent is extended or adjusted under 35 U.S.C. 154(b) by 150 days.

This patent is subject to a terminal disclaimer.

(21) Appl. No.: 18/520,919

(22) Filed: Nov. 28, 2023

(65) Prior Publication Data

US 2024/0338478 A1      Oct. 10, 2024

Related U.S. Application Data

(63) Continuation of application No. 18/297,376, filed on Apr. 7, 2023, now Pat. No. 11,874,950.

(51) Int. Cl.
| | |
|---|---|
| *H04L 29/06* | (2006.01) |
| *G06F 16/2455* | (2019.01) |
| *G06F 16/25* | (2019.01) |
| *G06F 21/62* | (2013.01) |

(52) U.S. Cl.
CPC .... *G06F 21/6245* (2013.01); *G06F 16/24558* (2019.01); *G06F 16/258* (2019.01)

(58) Field of Classification Search
CPC ....................... G06F 21/6245; G06F 16/24558
See application file for complete search history.

(56) References Cited

U.S. PATENT DOCUMENTS

| | | | |
|---|---|---|---|
| 7,058,603 | B1 | 6/2006 | Rhiando |
| 9,652,622 | B2 | 5/2017 | Garfinkle et al. |
| 10,289,816 | B1 | 5/2019 | Malassenet |
| 11,522,688 | B2 | 12/2022 | Goodsitt et al. |
| 11,593,510 | B1 | 2/2023 | Knox |
| 11,704,431 | B2 | 7/2023 | Kraus |

(Continued)

FOREIGN PATENT DOCUMENTS

| | | |
|---|---|---|
| CN | 116049626 A | 5/2023 |

OTHER PUBLICATIONS

Case, Benjamin et al. "The Privacy-preserving Padding Problem: Non-negative Mechanisms for Conservative Answers with Differential Privacy." 20 pages. Oct. 15, 2021. https://arxiv.org/abs/2110.08177 (Year: 2021).*

(Continued)

*Primary Examiner* — Jason K Gee
(74) *Attorney, Agent, or Firm* — Fish & Richardson P.C.

(57) ABSTRACT

Methods and systems for protecting membership privacy for secure computation and communication are provided. The method includes providing a first dataset, determining a number N based on a data privacy configuration, and generating a padding dataset having more than N elements. An intersection of the padding dataset and the first dataset is empty. The method also includes shuffling the padding dataset, up-sampling the first dataset with a first N elements of the shuffled padding dataset, and performing an intersection operation based on the up-sampled first dataset and a received dataset.

20 Claims, 7 Drawing Sheets

(56) References Cited

U.S. PATENT DOCUMENTS

| | | | |
|---|---|---|---|
| 2004/0179686 A1 | 9/2004 | Matsumura | |
| 2010/0131764 A1 | 5/2010 | Goh | |
| 2011/0202764 A1 | 8/2011 | Furukawa | |
| 2012/0143922 A1 | 6/2012 | Rane | |
| 2013/0212690 A1 | 8/2013 | Fawaz | |
| 2016/0150047 A1 | 5/2016 | O'Hare | |
| 2018/0101697 A1 | 4/2018 | Rane | |
| 2019/0065775 A1 | 2/2019 | Klucar, Jr. | |
| 2019/0244138 A1 | 8/2019 | Bhowmick | |
| 2019/0342270 A1* | 11/2019 | Laine | G06F 21/602 |
| 2019/0361794 A1 | 11/2019 | Maksyutov | |
| 2020/0250335 A1 | 8/2020 | Hockenbrocht | |
| 2020/0401726 A1 | 12/2020 | Lim et al. | |
| 2021/0073677 A1 | 3/2021 | Peterson | |
| 2021/0173856 A1 | 6/2021 | Chitnis | |
| 2021/0226924 A1* | 7/2021 | Yanai | H04L 63/0421 |
| 2021/0336771 A1 | 10/2021 | Mukherjee | |
| 2021/0360010 A1 | 11/2021 | Zaccak | |
| 2021/0399874 A1 | 12/2021 | Polyakov | |
| 2022/0100899 A1 | 3/2022 | Saillet | |
| 2022/0138348 A1 | 5/2022 | Bernau | |
| 2022/0244988 A1 | 8/2022 | Zhang | |
| 2022/0277097 A1 | 9/2022 | Cabot | |
| 2022/0335450 A1 | 10/2022 | Fenton | |
| 2022/0405800 A1 | 12/2022 | Walcott | |
| 2023/0017374 A1 | 1/2023 | Boehler | |
| 2023/0045553 A1 | 2/2023 | Deshpande | |
| 2023/0125887 A1 | 4/2023 | Habite | |
| 2023/0146259 A1 | 5/2023 | Liktor | |
| 2023/0214684 A1 | 7/2023 | Wang | |

OTHER PUBLICATIONS

International Search Report issued in PCT/SG2024/050231, dated May 15, 2024.

Pinkas et al., "Efficient circuit-based PSI via cuckoo hashing". https://encrypto.de/papers/PSWW18.pdf, Mar. 31, 2018, pp. 1-34 [Retrieved on May 8, 2024] Whole document.

Liang et al., "Security Relaxations for Improving Secure Multiparty Computation", Doctoral dissertation, George Mason University. https://www.proquest.com/openview/076466ff18b8292a1af214bce7231f08/1?pq-origsite=gscholar&cbl=18750&diss=y, Sep. 30, 2022, pp. 1-153 [Retrieved on May 8, 2024] Whole document.

Office Action dated Aug. 3, 2023 issued in the corresponding U.S. Appl. No. 18/297,339.

Office Action dated Jul. 11, 2023 issued in the corresponding U.S. Appl. No. 18/297,389.

Office Action dated Jun. 14, 2023 issued in the corresponding U.S. Appl. No. 18/297,405.

Notice of Allowance dated Aug. 30, 2023 issued in the corresponding U.S. Appl. No. 18/297,405.

Kairouz, Peter, Sweoong Oh, and Pramod Viswanath. "The composition theorem for differential privacy." International Conference on machine learning. PMLR, 2015 (Year: 2015).

Office Action dated Jun. 20, 2023 issued in the corresponding U.S. Appl. No. 18/297,424.

Notice of Allowance dated Aug. 2, 2023 issued in the corresponding U.S. Appl. No. 18/297,424.

Office Action dated Jul. 12, 2023 issued in the corresponding U.S. Appl. No. 18/297,447.

Du et al. DP-PSI: Private and secure set intersection, Aug. 28, 2022, Cornel University, https://doi.org/10.48550/arXiv.2208.13249V1, p. 1-9. (Year: 2022).

Notice of Allowance dated Jul. 25, 2023 issued in the corresponding U.S. Appl. No. 18/297,530.

Notice of Allowance dated Aug. 2, 2023 issued in the corresponding U.S. Appl. No. 18/297,545.

Notice of Allowance dated Aug. 7, 2023 issued in the corresponding U.S. Appl. No. 18/297,389.

Case, Benjamin et al. "The Privacy-preserving Padding Problem: Non-negative Mechanisms for Conservative Answers with Differential Privacy." 20 pages. Oct. 15, 2021. https://arxiv.org/abs/2110.08177.

Buddhavarapu et al., "Private matching for compute", Cryptology ePrint Archive, 2020, https://eprint.iacr.org/2020/599.

Guo et al., "Birds of a Feather Flock Together: How Set Bias Helps to Deanonymize You via Revealed Intersection Sizes", 31st USENIX Security Symposium, Aug. 10-12, 2022, Boston, MA, USA, https://www.usenix.org/conference/usenixsecurity22/presentation/guo.

Ion et al., "On Deploying Secure Computing: Private Intersection-Sum-with-Cardinality", 2020 IEEE European Symposium on Security and Privacy (EuroS&P), Date of Conference: Sep. 7-11, 2020, Date added to IEEE Xplore: Nov. 2, 2020, https://www.researchgate.net/publication/346584438_On_Deploying_Secure_Computing_Private_Intersection-Sum-with-Cardinality.

Chandran et al., "Circuit-PSI with Linear Complexity via Relaxed Batch OPPRF", Cryptology ePrint Archive, received Jan. 12, 2021, https://eprint.iacr.org/2021/034.

Pinkas et al., "SpOT-Light: Lightweight Private Set Intersection from Sparse OT Extension", Cryptology ePrint Archive, received Jun. 3, 2019, https://eprint.iacr.org/2019/634.

Chase et al., "Secret Shared Shuffle", Cryptology ePrint Archive, received Nov. 22, 2019, https://eprint.iacr.org/2019/1340.

Mohassel et al., "How to Hide Circuits in MPC: An Efficient Framework for Private Function Evaluation", Cryptology ePrint Archive, received Mar. 9, 2013, https://eprint.iacr.org/2013/137.

Garimella et al., "Private Set Operations from Oblivious Switching", Cryptology ePrint Archive, received Mar. 2, 2021, https://eprint.iacr.org/2021/243.

Dwork et al., "Differential Privacy and Robust Statistics", Association for Computing Machinery, May 31, 2009, pp. 371-380, https://dl.acm.org/doi/10.1145/1536414.1536466.

Dwork et al., "Differential Privacy Under Continual Observation", Association for Computing Machinery, Jun. 5, 2010, pp. 715-724, https://dl.acm.org/doi/10.1145/1806689.1806787.

Dwork et al. "Our Data, Ourselves: Privacy via Distributed Noise Generation", Advances in Cryptology-Eurocrypt 2006: 24th Annual International Conference on the Theory and Applications of Cryptographic Techniques, St. Petersburg, Russia, May 28-Jun. 1, 2006. Proceedings 25. Springer Berlin Heidelberg, 2006, https://doi.org/10.1007/11761679_29.

* cited by examiner

200

210 — Determine a size

220 — Generate a common set

230 — Shuffle the common set

240 — Up-sample dataset

250 — Shuffle and transform

260 — Exchange, shuffle, and transform

270 — Exchange and match

302

401

402

500

PROTECTING MEMBERSHIP FOR SECURE COMPUTATION AND COMMUNICATION

CROSS-REFERENCE TO RELATED APPLICATIONS

This application is a continuation of U.S. application Ser. No. 18/297,376, filed on Apr. 7, 2023, the entirety of which is incorporated here by reference.

FIELD

The embodiments described herein pertain generally to protecting membership privacy for secure computation and communication. More specifically, the embodiments described herein pertain to protecting membership (of an element, a member, a user, etc.) from being identified via an intersection size in private set intersection algorithms or protocols.

BACKGROUND

Private set intersection (PSI) is a secure two- or multi-party protocol by which intersection-related statistics are computed, and PSI has garnered significant industry interest. PSI algorithms or protocols permit two or more organizations to jointly compute a function (e.g., count, sum, etc.) over the intersection of their respective data sets without revealing to other party the intersection explicitly. In an application, two parties may be unwilling or unable to reveal the underlying data to each other, but they may still want to compute an aggregate population-level measurement. The two parties may want to do so while ensuring that the input data sets reveal nothing beyond these aggregate values about individual users.

SUMMARY

Many algorithms implementing the PSI protocol may ultimately reveal the intersection size between datasets of two or more parties. However, an attacker into the data communication may be able to use the revealed intersection size to infer the set membership of some elements belonging to a single organization. Disclosure of an element's membership in the dataset of one organization to another organization may risk violating privacy regulations, since the disclosure may be considered as identifying or tracking of one or more people between organizations.

Features in the embodiments disclosed herein may avoid the situations described above by providing a membership (of an element, a member, a user, etc.) protection scheme or algorithm based on e.g., a differential privacy (DP) protocol. Features in the embodiments disclosed herein may generate dummy (padding or filling) membership-identification elements for each party's dataset independently following a pre-calibrated distribution of noise, add the dummy elements to each dataset, and execute an algorithm based on a PSI protocol. Further features in the embodiments disclosed herein may lead to the intersection size revealed in the following PSI protocol being random and differentially private, making it almost impossible for an attacker to determine a user's membership to a dataset or organization.

In one example embodiment, a method for protecting membership privacy for secure computation and communication is provided. The method includes providing a first dataset; determining a number N based on a data privacy configuration; generating a padding dataset having 2*N elements, where an intersection of the padding dataset and the first dataset is empty; shuffling the padding dataset; up-sampling the first dataset with a first N elements of the shuffled padding dataset; and performing an intersection operation based on the up-sampled first dataset and a received dataset.

In another example embodiment, a membership privacy protection system for secure computation and communication is provided. The system includes a memory to store a first dataset and a processor. The processor is to provide a first dataset; determine a number N based on a data privacy configuration; generate a padding dataset having 2*N elements, where an intersection of the padding dataset and the first dataset is empty; shuffle the padding dataset; up-sample the first dataset with a first N elements of the shuffled padding dataset; and perform an intersection operation based on the up-sampled first dataset and a received dataset.

In yet another example embodiment, a non-transitory computer-readable medium having computer-executable instructions stored thereon is provided. The instructions, upon execution, cause one or more processors to perform operations including providing a first dataset; determining a number N based on a data privacy configuration; generating a padding dataset; shuffling the padding dataset; up-sampling the first dataset with a first N elements of the shuffled padding dataset; and performing an intersection operation based on the up-sampled first dataset and a received dataset.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Non-limiting and non-exhaustive descriptions are described with reference to the following drawings. The components in the figures are not necessarily to scale, emphasis instead being placed upon illustrating principles. In the detailed description that follows, embodiments are described as illustrations only since various changes and modifications may become apparent to those skilled in the art from the following detailed description.

DETAILED DESCRIPTION

Figure 1:
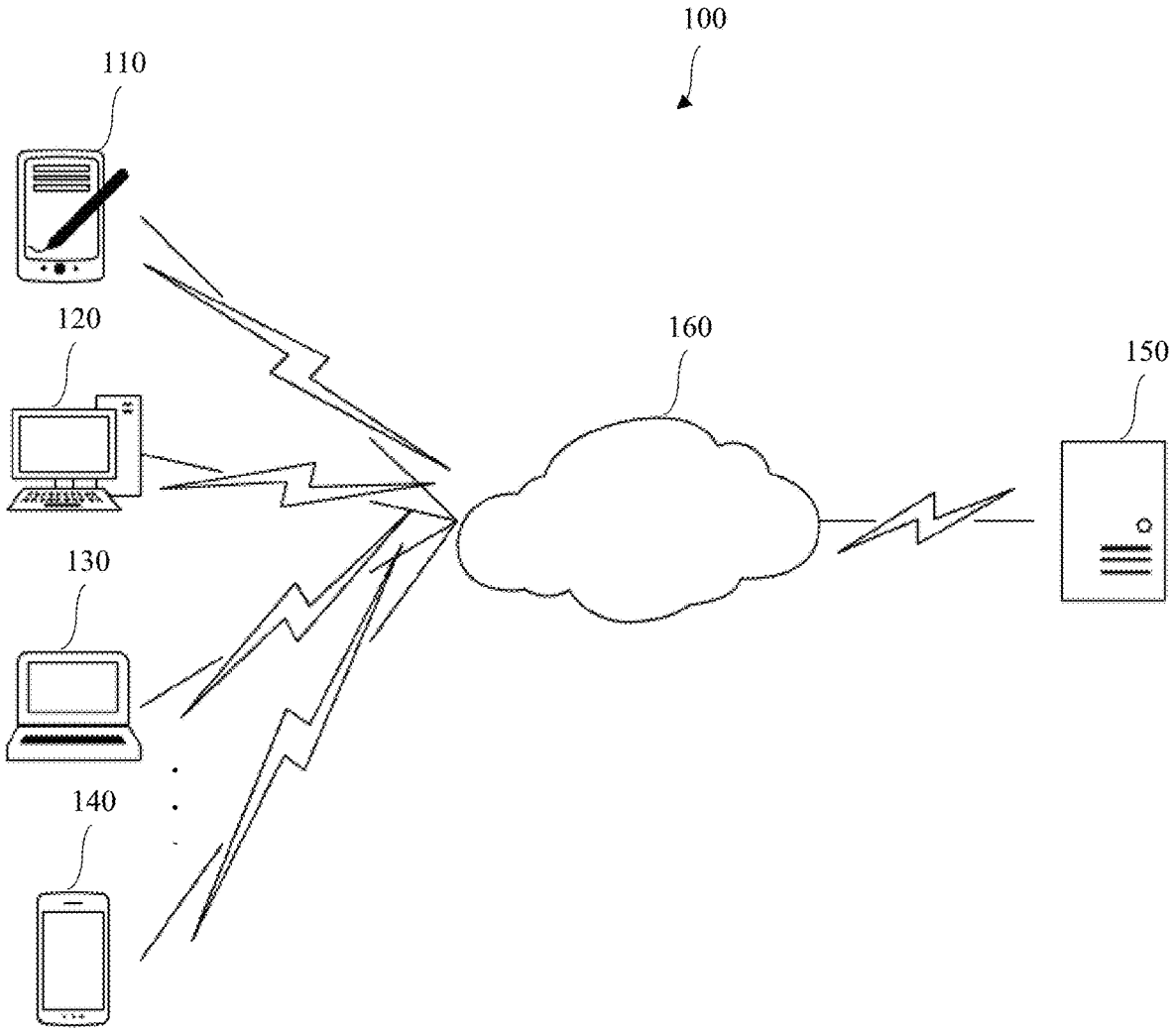
FIG. 1 is a schematic view of an example membership privacy protection system, arranged in accordance with at least some embodiments described herein.

In the following detailed description, particular embodiments of the present disclosure are described herein with reference to the accompanying drawings, which form a part of the description. In this description, as well as in the drawings, like-referenced numbers represent elements that may perform the same, similar, or equivalent functions, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

It is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

Additionally, the present disclosure may be described herein in terms of functional block components and various processing steps. It should be appreciated that such functional blocks may be realized by any number of hardware and/or software components configured to perform the specified functions.

The scope of the disclosure should be determined by the appended claims and their legal equivalents, rather than by the examples given herein. For example, the steps recited in any method claims may be executed in any order and are not limited to the order presented in the claims. Moreover, no element is essential to the practice of the disclosure unless specifically described herein as "critical" or "essential".

As referenced herein, a "data set" or "dataset" is a term of art and may refer to an organized collection of data stored and accessed electronically. In an example embodiment, a dataset may refer to a database, a data table, a portion of a database or data table, etc. It is to be understood that a dataset may correspond to one or more database tables, of which every column of a database table represents a particular variable or field, and each row of the database table corresponds to a given record of the dataset. The dataset may list values for each of the variables, and/or for each record of the dataset. It is also to be understood that a dataset may also or alternatively refer to a set of related data and the way the related data is organized. In an example embodiment, each record of a dataset may include field(s) or element(s) such as one or more predefined or predetermined identifications (e.g., membership identifications, user identifications, etc., such as user's name, e-mail address, phone numbers, etc.), and/or one or more attributes or features or values associated with the one or more identifications. It is to be understood that any user's identification(s) and/or user's data described in this document are allowed, permitted, and/or otherwise authorized by the user for use in the embodiments described herein and in their proper legal equivalents as understood by those of skill in the art.

As referenced herein, "inner join" or "inner-join" is a term of art and may refer to an operation or function that includes combining records from datasets, particularly when there are matching values in a field common to the datasets. For example, an inner join may be performed with a "Departments" dataset and an "Employees" dataset to determine all the employees in each department. It is to be understood that in the resulting dataset (i.e., the "intersection") of the inner join operation, the inner join may contain the information from both datasets that is related to each other. An outer join, on the other hand, may also contain information that is not related to the other dataset in its resulting dataset. A private inner join may refer to an inner join operation of datasets of two or more parties that does not reveal the data in the intersection of datasets of the two or more parties.

As referenced herein, "hashing" may refer to an operation or function that transforms or converts an input (a key such as a numerical value, a string of characters, etc.) into an output (e.g., another numerical value, another string of characters, etc.). It is to be understood that hashing is a term of art and may be used in cyber security application(s) to access data in a small and nearly constant time per retrieval.

As referenced herein, "MPC" or "multi-party computation" is a term of art and may refer to a field of cryptography with the goal of creating schemes for parties to jointly compute a function over the joint input of the parties while keeping respective input private. It is to be understood that, unlike traditional cryptographic tasks where cryptography may assure security and integrity of communication or storage when an adversary is outside the system of participants (e.g., an eavesdropper on the sender and/or the receiver), the cryptography in MPC may protect participants' privacy relative to each other.

As referenced herein, "ECC" or "elliptic-curve cryptography" is a term of art and may refer to a public-key cryptography based on the algebraic structure of elliptic curves over finite fields. It is to be understood that the ECC may allow smaller keys compared to non-EC cryptography to provide equivalent security. It is also to be understood that "EC" or "elliptic curve" may be applicable for key agreement, digital signatures, pseudo-random generators, and/or other tasks. Elliptic curves may be indirectly used for encryption by combining a key agreement between/among the parties with a symmetric encryption scheme. Elliptic curves may also be used in integer factorization algorithms based on elliptic curves that have applications in cryptography.

As referenced herein, "elliptic-curve Diffie-Hellman" or "ECDH" is a term of art and may refer to a key agreement protocol or a corresponding algorithm that allows two or more parties, each having an elliptic-curve public-private key pair, to establish a shared secret over an unsecured channel. It is to be understood that the shared secret may be directly used as a key or to derive another key. It is also to be understood that the key, or the derived key, may then be used to encrypt or encode subsequent communications using a symmetric-key cipher. It is further to be understood that ECDH may refer to a variant of the Diffie-Hellman protocol using elliptic-curve cryptography.

As referenced herein, "shuffle", "shuffling", "permute", or "permuting" is a term of art and may refer to an action or algorithm for randomly rearranging the order of the records (elements, rows, etc.) of e.g., an array, a dataset, a database, a data table, etc.

As referenced herein, "differential privacy" or "DP" is a term of art and may refer to a protocol, a system, or an algorithm for publicly sharing information regarding a dataset by describing the patterns of groups of elements within the dataset while withholding information about individual users listed in the dataset. It is to be understood that for differential privacy, if the effect of making an arbitrary single substitution of a user's record in the dataset is smaller than a desired or predetermined threshold, the query result cannot be used to infer much about any single individual user, and therefore provides privacy. It is to also be understood that differential privacy may refer to a constraint on the algorithms used to publish aggregate information about a statistical dataset or database, which limits the disclosure of private information of records for individuals whose information is in the dataset or database.

As referenced herein, a "randomized algorithm" for DP is a term of art and may refer to an algorithm that employs a degree of randomness as part of its logic or procedure. It is to be understood that a randomized algorithm typically uses uniformly random bits as an auxiliary input to guide its behavior, for achieving good performance over all possible random choices determined by the random bits; thus either the running time, or the output, or both, are random variables.

As referenced herein, "private set intersection" is a term of art and may refer to a secure multi-party computation cryptographic operation, algorithm, or function by which two or more parties holding respective datasets compare encrypted versions of these datasets in order to compute the intersection. It is to be understood that for private set intersection, neither party reveals data elements to the counterparty except for the elements in the intersection.

As referenced herein, "secret sharing" or "secret splitting" is a term of art and may refer to cryptographic functions or algorithms for generating a secret, breaking the secret into multiple shares, and distributing the shares among multiple parties, so that only when the parties bring together their respective shares can the secret be reconstructed. It is to be understood that secret sharing may refer to functions or algorithms for distributing a secret among a group, in such a way that no individual holds any intelligible information about the secret, but when a sufficient number of individuals combine their "shares", the secret may be reconstructed. It is also to be understood that whereas unsecure secret sharing may allow an attacker to gain more information with each share, secure secret sharing may be "all or nothing", whereas "all" may mean the necessary number of shares.

FIG. 1 is a schematic view of an example membership privacy protection system 100, arranged in accordance with at least some embodiments described herein.

The system 100 may include terminal devices 110, 120, 130, and 140, a network 160, and a server 150. It is to be understood that FIG. 1 only shows illustrative numbers of the terminal devices, the network, and the server. The embodiments described herein are not limited to the number of the terminal devices, the network, and/or the server described. That is, the number of terminal devices, networks, and/or servers described herein are provided for descriptive purposes only and are not intended to be limiting.

In accordance with at least some example embodiments, the terminal devices 110, 120, 130, and 140 may be various electronic devices. The various electronic devices may include but not be limited to a mobile device such as a smartphone, a tablet computer, an e-book reader, a laptop computer, a desktop computer, and/or any other suitable electronic devices.

In accordance with at least some example embodiments, the network 160 may be a medium used to provide a communications link between the terminal devices 110, 120, 130, 140 and the server 150. The network 160 may be the Internet, a local area network (LAN), a wide area network (WAN), a local interconnect network (LIN), a cloud, etc. The network 160 may be implemented by various types of connections, such as a wired communications link, a wireless communications link, an optical fiber cable, etc.

In accordance with at least some example embodiments, the server 150 may be a server for providing various services to users using one or more of the terminal devices 110, 120, 130, and 140. The server 150 may be implemented by a distributed server cluster including multiple servers or may be implemented by a single server.

A user may use one or more of the terminal devices 110, 120, 130, and 140 to interact with the server 150 via the network 160. Various applications or localized interfaces thereof, such as social media applications, online shopping services, or the like, may be installed on the terminal devices 110, 120, 130, and 140.

It is to be understood that software applications or services according to the embodiments described herein and/or according to the services provided by the service providers may be performed by the server 150 and/or the terminal devices 110, 120, 130, and 140 (which may be referred to herein as user devices). Accordingly, the apparatus for the software applications and/or services may be arranged in the server 150 and/or in the terminal devices 110, 120, 130, and 140.

It is also to be understood that when a service is not performed remotely, the system 100 may not include the network 160, but include only the terminal device 110, 120, 130, and 140 and/or the server 150.

It is further to be understood that the terminal device 110, 120, 130, and 140 and/or the server 150 may each include one or more processors, a memory, and a storage device storing one or more programs. The terminal device 110, 120, 130, and 140 and/or the server 150 may also each include an Ethernet connector, a wireless fidelity receptor, etc. The one or more programs, when being executed by the one or more processors, may cause the one or more processors to perform the method(s) described in any embodiments described herein. Also, it is to be understood that a computer readable non-volatile medium may be provided according to the embodiments described herein. The computer readable medium stores computer programs. The computer programs are used to, when being executed by a processor, perform the method(s) described in any embodiments described herein.

Figure 2:
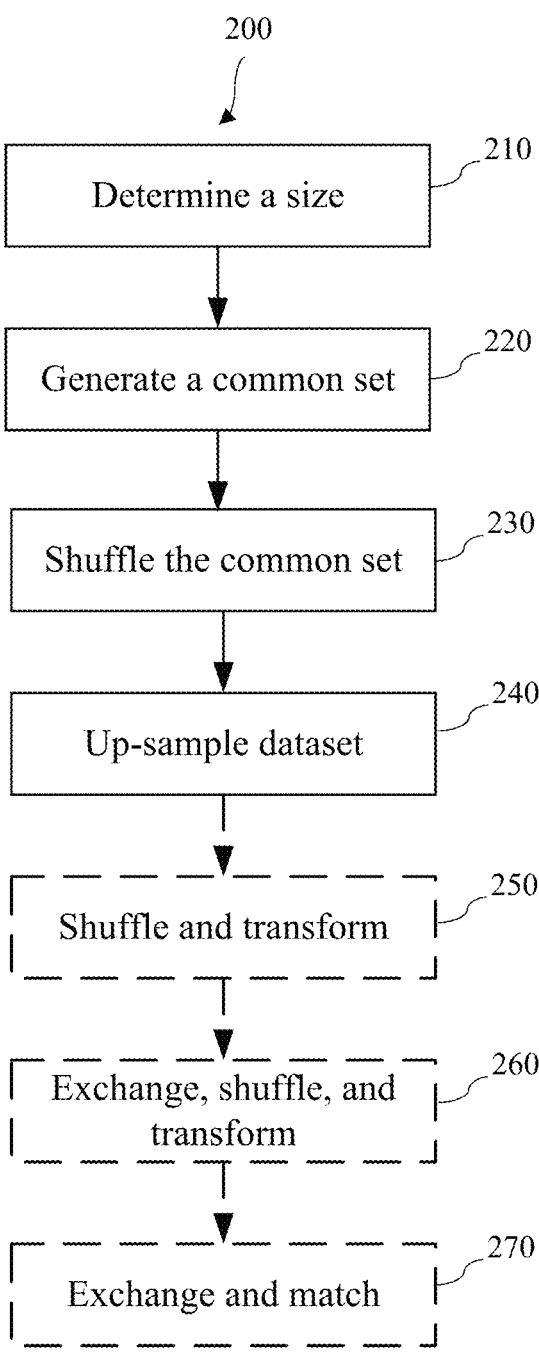
FIG. 2 is a flow chart illustrating an example processing flow for protecting membership privacy in a private set intersection operation, in accordance with at least some embodiments described herein.
Figure 3A:
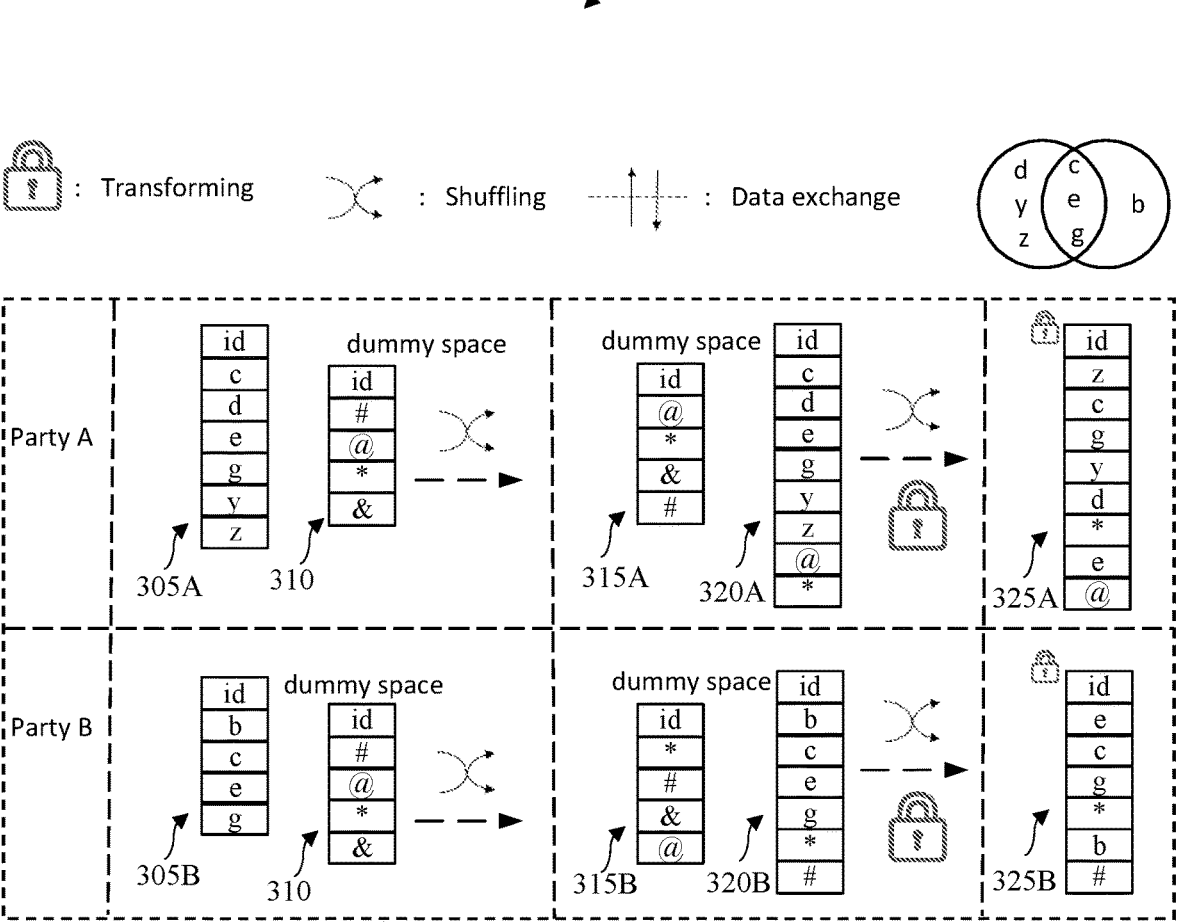
FIG. 3A shows a first portion of a schematic diagram illustrating an example of the processing flow of FIG. 2, in accordance with at least some embodiments described herein.
Figure 3B:
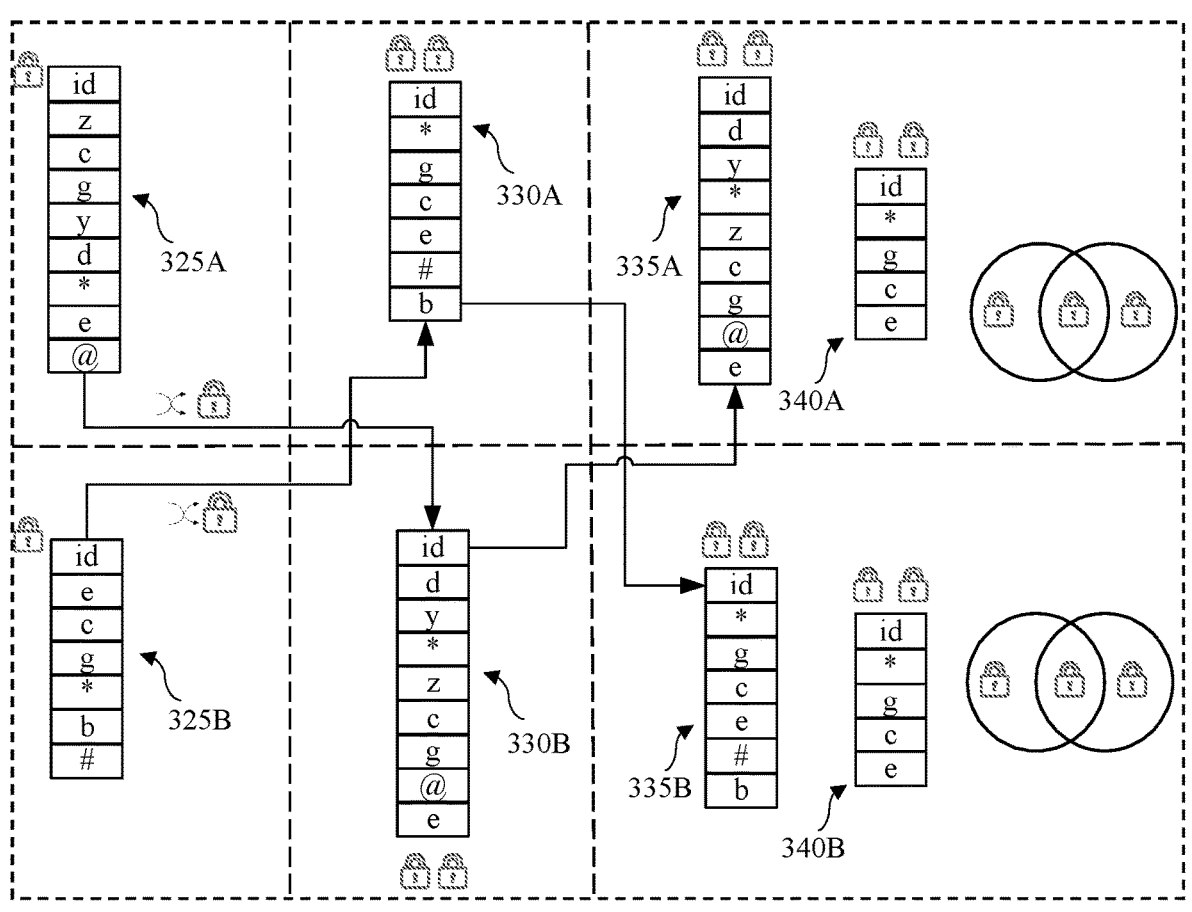
FIG. 3B shows a second portion of a schematic diagram illustrating an example of the processing flow of FIG. 2, in accordance with at least some embodiments described herein.

FIG. 2 is a flow chart illustrating an example processing flow 200 for protecting membership privacy in a private set intersection operation, in accordance with at least some embodiments described herein. FIG. 3A shows a first portion 301 of a schematic diagram illustrating an example of the processing flow 200 of FIG. 2, in accordance with at least some embodiments described herein. FIG. 3B shows a second portion 302 of a schematic diagram illustrating an example of the processing flow 200 of FIG. 2, in accordance with at least some embodiments described herein.

Figure 5:
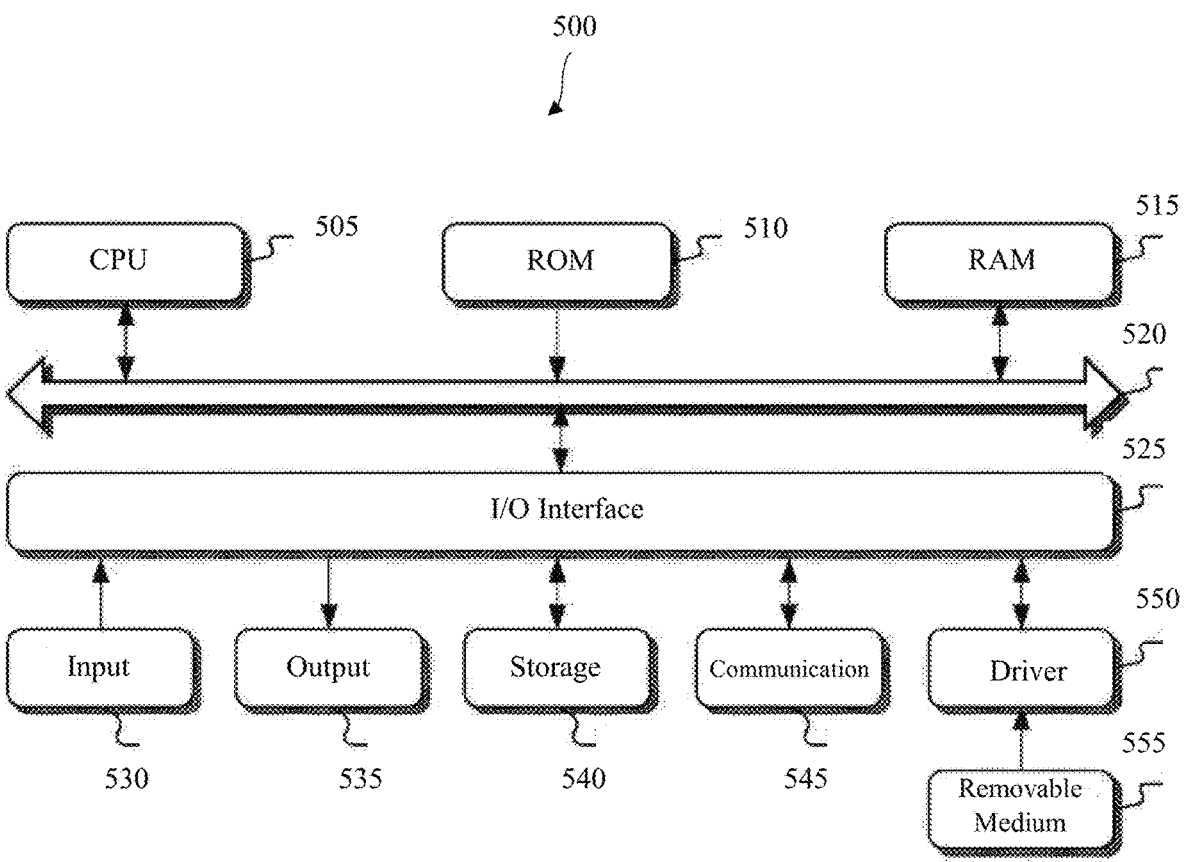
FIG. 5 is a schematic structural diagram of an example computer system applicable to implementing an electronic device, arranged in accordance with at least some embodiments described herein.

It is to be understood that the processing flow 200 disclosed herein can be conducted by one or more processors (e.g., the processor of one or more of the terminal device 110, 120, 130, and 140 of FIG. 1, the processor of the server 150 of FIG. 1, the central processor unit 505 of FIG. 5, and/or any other suitable processor), unless otherwise specified.

It is also to be understood that the processing flow 200 can include one or more operations, actions, or functions as illustrated by one or more of blocks 210, 220, 230, 240, 250, 260, and 270. These various operations, functions, or actions may, for example, correspond to software, program code, or program instructions executable by a processor that causes the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation. It is to be understood that before the processing flow 200, operations including initializations or the like may be performed. For example, system parameters and/or application parameters may be initialized. Processing flow 200 may begin at block 210.

At block 210 (Determine a size), the processor may determine a size N (i.e., a number) that is to be used for generating a padding/filling dataset to achieve a desired data privacy protection goal or performance (described in details below). It is to be understood that the size N is to be determined to ensure that a privacy configuration and/or privacy requirement is met or satisfied. In an example embodiment, the privacy configuration and/or privacy requirement may include configurations and/or requirement(s) (described in details below) defined in a differential privacy protocol or algorithm. Processing may proceed from block 210 to block 220.

At block 220 (Generate a common set), the processor may generate a dataset (e.g., 310 of FIG. 3A). It is to be understood that the dataset 310 may be a padding or filling dataset that is commonly used or shared by both Party A and Party B. In an example embodiment, the dataset 310 has a size of 2*N. In other example embodiments, the dataset 310 may have a size that is equal to or greater than N. It is to be understood that a size of the dataset 310 may refer to the number of records (or rows, elements, etc.) of the dataset 310. It is also to be understood that when the dataset 310 has a size of 2*N, the subsequent operations such as the PSI operations on the up-sampled datasets (e.g., 320A, 320B of FIG. 3A, described in details below) may guarantee being ($\epsilon$, $\delta$)-differentially private (described or defined below) for both Party A and Party B. It is also to be understood that in an example embodiment, "$\epsilon$" may refer to a first privacy parameter, and "$\delta$" may refer to a second privacy parameter. In an example embodiment, $\epsilon$ and/or $\delta$ may be predetermined to achieve a desired data privacy protection goal or performance.

In a differential privacy protocol or algorithm, it is to be understood that a privacy-protection mechanism M (e.g., a randomized algorithm, etc.) used in the differential privacy protocol or algorithm may use an input dataset A and a neighboring input dataset A' that differs from A by only one element (e.g., A' has one entry less than A, etc.). The privacy-protection mechanism M may map the input dataset(s) to a real value in an R domain. The privacy-protection mechanism M is deemed as "($\epsilon$, $\delta$)-differentially private" (i.e., differentially private based on the $\epsilon$ and $\delta$), if for any pair of (A, A') and every measurable set E∈ R, the probability of (M(A)∈ E) is less than or equal to $e^{\epsilon}$×the probability of (M(A')∈ E)+$\delta$, where e is the Euler's number. Features (e.g., the determined size N, etc.) in the embodiments disclosed herein may be "($\epsilon$, $\delta$)-differentially private" (i.e., "differentially private" based on the $\epsilon$ and $\delta$) for the predetermined $\epsilon$ and $\delta$. That is, the size N may be determined based on the predetermined $\epsilon$ and $\delta$, such that being "($\epsilon$, $\delta$)-differentially private" may be achieved for the subsequent operations such as the PSI operations on the up-sampled datasets (i.e., the subsequent operations are "differentially private" based on the $\epsilon$ and $\delta$).

It is to be understood that the above configuration or requirement of the differential privacy protocol or algorithm may refer to a measure of "how much data privacy is afforded (e.g., by a query on the input dataset) to perform the operations or functions?" The measurable set E may refer to all potential output of M that may be predicted. The first privacy parameter "$\epsilon$" may refer to a privacy budget (i.e., a limit of how much privacy it is acceptable with leaking), e.g., indicating a maximum distance between a query on dataset A and the same query on dataset A'. The smaller the value of e is, the stronger the privacy protection is for the privacy-protection mechanism. The second privacy parameter "$\delta$" may refer to a probability, such as a probability of information being accidentally leaked. In an example embodiment, a required or predetermined value of e may range from at or about 1 to at or about 3. The required or predetermined value of 8 may range from at or about $10^{-10}$ (or at about $10^{-8}$) to at or about $10^{-6}$. To achieve, meet, satisfy, or guarantee the requirement to be ($\epsilon$, $\delta$)-differentially private, the value of N may be at or about a few thousands.

In an example embodiment, the relationship among $\epsilon$, $\delta$, and N (represented as "$\tau$") may be represented by the following:

$$\delta(\epsilon) = \frac{1}{C_{2\tau}^{\tau}}\left(1 + \sum_{z=\left\lceil\frac{\epsilon/2\tau-1}{\epsilon/2+1}\right\rceil}^{\tau-1}\left[(C_{\tau}^{z})^2 - e^{\epsilon}\left(C_{\tau}^{z+1}\right)^2\right]\right),$$

where C may refer to a combination operation (i.e., a selection of items from a data set that has distinct members, such that the order of selection does not matter). That is, the size N may be determined following a pre-calibrated or predetermined noise distribution, e.g., based on the required or predetermined $\epsilon$ and $\delta$, such that being "($\epsilon$, $\delta$)-differentially private" may be achieved for the subsequent operations such as the PSI operations on the up-sampled datasets.

It is to be understood that the processor may also provide a dataset (e.g., 305A of FIG. 3A) for Party A, and/or provide a dataset (e.g., 305B of FIG. 3A) for Party B. In an example embodiment, the size of the dataset 305A or 305B may be in the range from tens to hundreds of thousands records. That is, compared to the size of the dataset 305A or 305B, the size of the dataset 310 (e.g., 2*N, etc.) may be at or about 1% or less of the size of the dataset 305A or 305B, and thus the overhead introduced (e.g., by using the dataset 310 to protect membership privacy) may be trivial compared to the size of the dataset 305A or 305B. It is also to be understood that the dataset 310 is generated such that the intersection (e.g., a result of an inner join operation) of the dataset 310 and the dataset 305A is empty (i.e., having a size of zero), and the intersection of the dataset 310 and the dataset 305B is empty. That is, there is no common or shared element between the dataset 310 and the dataset 305A and/or between the dataset 310 and the dataset 305B. Processing may proceed from block 220 to block 230.

At block 230 (Shuffle the common set), the processor of the respective device may shuffle (e.g., randomly permute) the dataset 310 independently for Party A and for Party B, to produce a shuffled dataset (e.g., 315A of FIG. 3A) for Party A, and a shuffled dataset (e.g., 315B of FIG. 3A) for Party B. Processing may proceed from block 230 to block 240.

At block 240 (Up-sample dataset), the processor of the respective device may up-sample the dataset 305A for Party A and/or up-sample the dataset 305B for Party B. It is to be understood that up-sampling the dataset 305A may include (1) selecting or obtaining the first N elements (or records, rows, etc.) of the dataset 315A, and (2) generating a union (resulting the dataset 320A of FIG. 3A) of the dataset 305A and the first N elements of the dataset 315A. Up-sampling the dataset 305B may include (1) selecting or obtaining the first N elements (or records, rows, etc.) of the dataset 315B, and (2) generating a union (resulting the dataset 320B of FIG. 3A) of the dataset 305B and the first N elements of the dataset 315B. Processing may proceed from block 240 to block 250.

It is to be understood that the process in blocks 250, 260, and 270 are for illustrative purpose only and may be implemented in different ways. An example of performing a privacy preserving set intersection algorithm is shown in FIGS. 3A and 3B, in which an application of membership privacy protection in an ECDH-PSI algorithm (i.e., a PSI algorithm based on ECDH) is illustrated. It is to be understood that features in the embodiments disclosed herein may be applied to any other suitable PSI protocols or algorithms.

At block 250 (Shuffle and transform), the processor of a respective device may shuffle the dataset 320A to obtain or generate the dataset 325A for Party A, and/or shuffle the dataset 320B to obtain or generate the dataset 325B for Party B.

The processor may also transform one or more fields/columns of the dataset 325A containing identifications (e.g., membership identifications, user identifications, etc.) using a transform scheme for Party A.

It is to be understood that the function or operation to "transform" or of "transforming" a dataset or a portion thereof, e.g., one or more columns (or rows) of a dataset such as one or more identification fields/columns (or records/rows), etc., may refer to processing (e.g., encrypting, decrypting, encoding, decoding, manipulating, compressing, decompressing, converting, etc.) the dataset or a portion thereof. It is also to be understood that the "transform scheme" may refer to an algorithm, protocol, or function of performing the processing (e.g., encrypting, decrypting, encoding, decoding, manipulating, compressing, decompressing, converting, etc.) the dataset or a portion thereof. In an example embodiment, the processor may encrypt (or decrypt, encode, decode, manipulate, compress, decompress, convert, etc.) identifications of the dataset 325A using a key of Party A based on an ECC algorithm or protocol. The processor may also transform identifications of the dataset 325B using a transform scheme for Party B. In an example embodiment, the processor may encrypt (or decrypt, encode, decode, manipulate, compress, decompress, convert, etc.) identifications of the dataset 325B using a key of Party B based on the ECC algorithm or protocol.

It is to be understood that at block 250, for Party A and/or Party B, a sequence of the transforming of identifications of the dataset and the shuffling of the dataset may be switched or changed, without impacting the purpose of the resultant dataset. Processing may proceed from block 250 to block 260.

At block 260 (Exchange, shuffle, and transform), the processor of the respective device may exchange the dataset 325A and the dataset 325B between Party A and Party B. For Party A, the processor may dispatch or send the dataset 325A to Party B, and receive or obtain the dataset 325B from Party B as dataset 330A (See FIG. 3B). For Party B, the processor may dispatch or send the dataset 325B to Party A, and receive or obtain the dataset 325A from Party A as dataset 330B (See FIG. 3B).

The processor may also shuffle the dataset 330A for Party A, and/or shuffle the dataset 330B for Party B.

The processor may further transform identifications of the dataset 330A using a transform scheme for Party A. In an example embodiment, the processor may encrypt (or decrypt, encode, decode, manipulate, compress, decompress, convert, etc.) identifications of the dataset 330A using a key of Party A based on ECC. The processor may further transform identifications of the dataset 330B using a transform scheme for Party B. In an example embodiment, the processor may encrypt (or decrypt, encode, decode, manipulate, compress, decompress, convert, etc.) identifications of the dataset 330B using a key of Party B based on ECC. It is to be understood that the results of transforming the identification field/column using a key of Party A and then transforming the identification field/column using a key of Party B may be the same as the results of transforming the identification field/column using a key of Party B and then transforming the identification field/column using a key of Party A.

It is to be understood that at block 260, for Party A and/or Party B, a sequence of the transforming of identifications of the dataset and the shuffling of the dataset may be switched or changed, without impacting the purpose of the resultant dataset. Processing may proceed from block 260 to block 270.

At block 270 (Exchange and match), the processor of the respective device may exchange the dataset 330A and the dataset 330B between Party A and Party B. For Party A, the processor may dispatch or send the dataset 330A to Party B, and receive or obtain the dataset 330B from Party B as dataset 335A (See FIG. 3B). For Party B, the processor may dispatch or send the dataset 330B to Party A, and receive or obtain the dataset 330A from Party A as dataset 335B (See FIG. 3B).

The processor may also perform a match (e.g., a PSI operation) between the dataset 335A and the dataset 330A to obtain or generate an intersection (dataset 340A of FIG. 3B) for Party A. The processor may also perform a match (e.g., a PSI operation) between the dataset 335B and the dataset 330B to obtain or generate an intersection (dataset 340B of FIG. 3B) for Party B.

It is to be understood that the intersections 340A and/or 340B may be used for further processing such as generating secret shares, gathering secret shares, and/or generating the results by combining gathered secret shares, etc.

It is also to be understood that as illustrated in FIGS. 3A and 3B, a size of the intersection of dataset 305A and 305B is 3 (three records, rows, elements, etc.), while a size of the intersection 340A or 340B is 4 (i.e., the size of the intersection of dataset 305A and 305B plus a random element "*" due to the introducing of the dataset 310 for up-sampling). That is, features in the embodiments disclosed herein may lead to the intersection size revealed in the following PSI protocol being random and differentially private, making it almost impossible for an attacker to determine a user's membership.

Figure 4A:
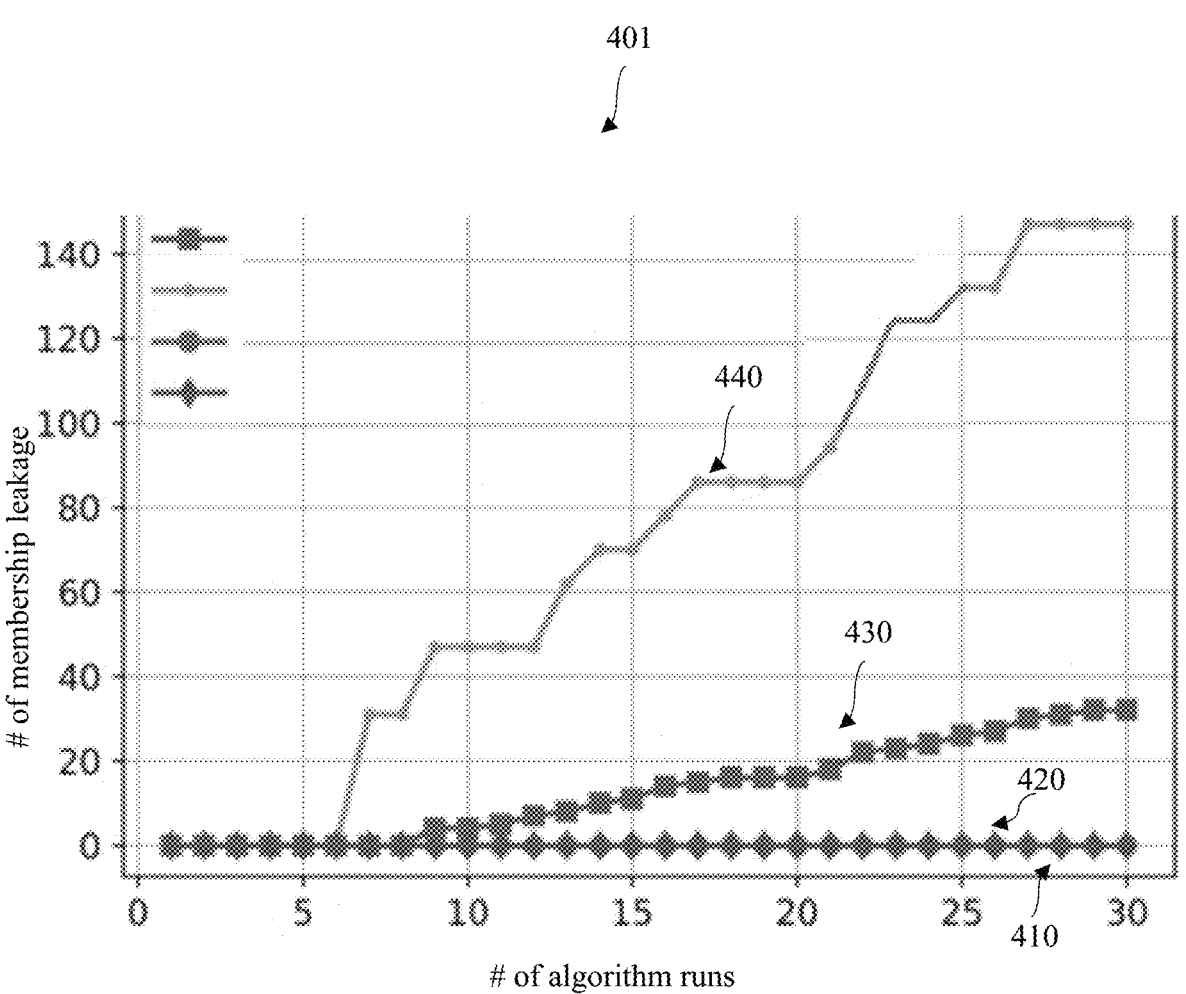
FIG. 4A illustrates an example performance comparison among various algorithms, in accordance with at least some embodiments described herein.
Figure 4B:
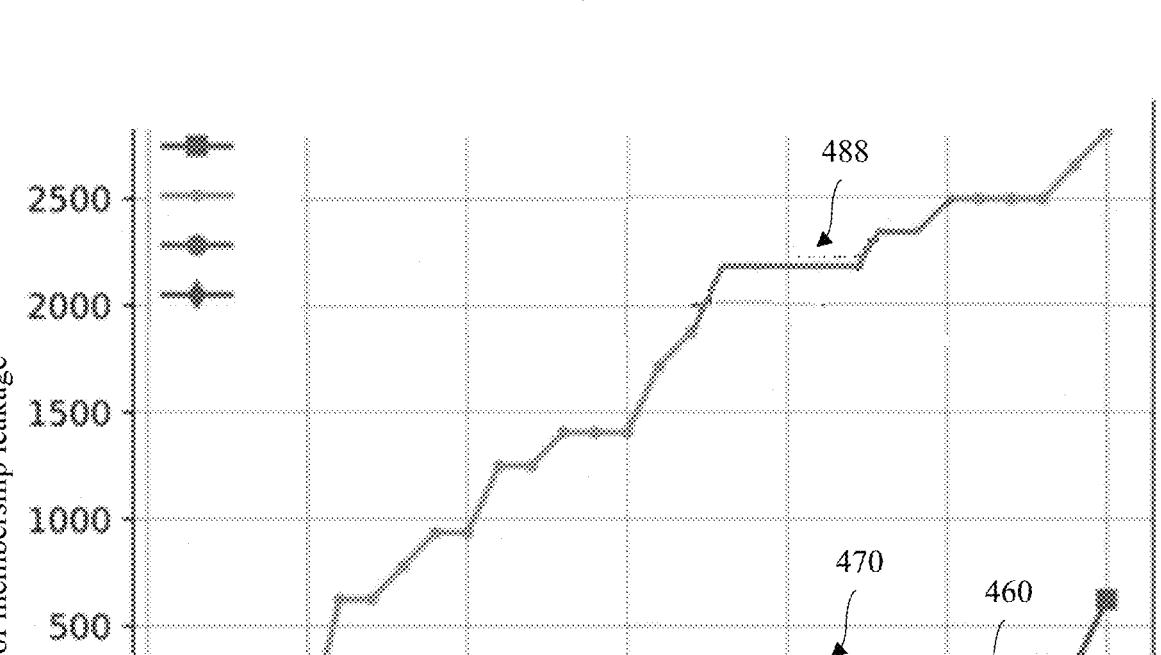
FIG. 4B illustrates another example performance comparison among various algorithms, in accordance with at least some embodiments described herein.

FIG. 4A illustrates an example performance comparison 401 among various algorithms (e.g., PSI algorithms with or without adding the padding or filling elements), in accordance with at least some embodiments described herein. FIG. 4B illustrates another example performance comparison 402 among various algorithms, in accordance with at least some embodiments described herein.

It is to be understood that a performance (e.g., an effectiveness of membership privacy protection, etc.) comparison has been conducted between the algorithm described in the embodiments disclosed herein and an existing private set intersection algorithm, using two privacy evaluation methods. The horizontal coordinates in FIGS. 4A and 4B indicate the number of runs or iterations of each algorithm. The vertical coordinates in FIGS. 4A and 4B indicate the number of user or member or membership leakages (i.e., how many users' membership to a dataset or organization may be revealed or identified) in the datasets for each algorithm.

FIG. 4A shows the membership privacy protection when Party A tracks its users on Party B's platform. The algorithm described in the embodiments disclosed herein can successfully anonymize Party A's user with no membership privacy leakage (see 410 when one privacy evaluation method is used; and see 420, which overlaps 410, when another privacy evaluation method is used). The existing private set intersection algorithm has a significant number of user leakage tracked (see 430 when one privacy evaluation method is used, and see 440 when another privacy evaluation method is used).

FIG. 4B shows the membership privacy protection when Party B tracks its users on the Party A's platform. The algorithm described in the embodiments disclosed herein can successfully anonymized Party B's user with no membership privacy leakage (see 450 when one privacy evaluation method is used; and see 460, which overlaps 450, when another privacy evaluation method is used). The existing private set intersection algorithm has a significant number of user leakage tracked (see 470 when one privacy evaluation method is used; and see 480 when another privacy evaluation method is used).

FIG. 5 is a schematic structural diagram of an example computer system 500 applicable to implementing an electronic device (for example, the server or one of the terminal devices shown in FIG. 1), arranged in accordance with at least some embodiments described herein. It is to be understood that the computer system shown in FIG. 5 is provided for illustration only instead of limiting the functions and applications of the embodiments described herein.

As depicted, the computer system 500 may include a central processing unit (CPU) 505. The CPU 505 may perform various operations and processing based on programs stored in a read-only memory (ROM) 510 or programs loaded from a storage device 540 to a random-access memory (RAM) 515. The RAM 515 may also store various data and programs required for operations of the system 500. The CPU 505, the ROM 510, and the RAM 515 may be connected to each other via a bus 520. An input/output (I/O) interface 525 may also be connected to the bus 520.

The components connected to the I/O interface 525 may further include an input device 530 including a keyboard, a mouse, a digital pen, a drawing pad, or the like; an output device 535 including a display such as a liquid crystal display (LCD), a speaker, or the like; a storage device 540 including a hard disk or the like; and a communication device 545 including a network interface card such as a LAN card, a modem, or the like. The communication device 545 may perform communication processing via a network such as the Internet, a WAN, a LAN, a LIN, a cloud, etc. In an embodiment, a driver 550 may also be connected to the I/O interface 525. A removable medium 555 such as a magnetic disk, an optical disk, a magneto-optical disk, a semiconductor memory, or the like may be mounted on the driver 550 as desired, such that a computer program read from the removable medium 555 may be installed in the storage device 540.

It is to be understood that the processes described with reference to the flowchart of FIG. 2 and/or the processes described in other figures may be implemented as computer software programs or in hardware. The computer program product may include a computer program stored in a computer readable non-volatile medium. The computer program includes program codes for performing the method shown in the flowcharts and/or GUIs. In this embodiment, the computer program may be downloaded and installed from the network via the communication device 545, and/or may be installed from the removable medium 555. The computer program, when being executed by the central processing unit (CPU) 505, can implement the above functions specified in the method in the embodiments disclosed herein.

It is to be understood that the disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., a field programmable gate array, an application specific integrated circuit, or the like.

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory, electrically erasable programmable read-only memory, and flash memory devices; magnetic disks, e.g., internal hard disks or removable disks; magneto optical disks; and compact disc read-only memory and digital video disc read-only memory disks. The processor and the memory can be supplemented by, or incorporated in, special purpose logic circuitry.

It is to be understood that different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

Aspects

It is appreciated that any one of aspects can be combined with each other.

Aspect 1. A method for protecting membership privacy for secure computation and communication, the method comprising: providing a first dataset; determining a number N based on a data privacy configuration; generating a padding dataset having 2*N elements, wherein an intersection of the padding dataset and the first dataset is empty; shuffling the padding dataset; up-sampling the first dataset with a first N elements of the shuffled padding dataset; performing an intersection operation based on the up-sampled first dataset and a received dataset.

Aspect 2. The method of aspect 1, wherein the data privacy configuration includes a first predetermined data privacy parameter and a second predetermined data privacy parameter, wherein the N is determined such that the intersection operation is differentially private given the first predetermined data privacy parameter and the second predetermined data privacy parameter.

Aspect 3. The method of aspect 1 or aspect 2, wherein the up-sampled first dataset is a union of the first dataset and the first N elements of the shuffled padding dataset.

Aspect 4. The method of any one of aspects 1-3, further comprising: shuffling the up-sampled first dataset; transforming the shuffled up-sampled first dataset using a transform scheme; and dispatching the transformed shuffled up-sampled first dataset.

Aspect 5. The method of any one of aspects 1-4, further comprising: providing a second dataset, wherein an intersection of the padding dataset and the second dataset is empty; shuffling the padding dataset; up-sampling the second dataset with a first N elements of the shuffled padding dataset.

Aspect 6. The method of aspect 5, further comprising: shuffling the up-sampled second dataset; transforming the shuffled up-sampled second dataset using the transform scheme; and dispatching the transformed shuffled up-sampled second dataset.

Aspect 7. The method of aspect 6, further comprising: shuffling the transformed shuffled up-sampled second dataset; and transforming the shuffled transformed shuffled up-sampled second dataset using the transform scheme; wherein the received dataset is the transformed shuffled transformed shuffled up-sampled second dataset.

Aspect 8. A membership privacy protection system for secure computation and communication, the system comprising: a memory to store a first dataset; a processor to: provide a first dataset; determine a number N based on a data privacy configuration; generate a padding dataset having 2*N elements, wherein an intersection of the padding dataset and the first dataset is empty; shuffle the padding dataset; up-sample the first dataset with a first N elements of the shuffled padding dataset; perform an intersection operation based on the up-sampled first dataset and a received dataset.

Aspect 9. The system of aspect 8, wherein the data privacy configuration includes a first predetermined privacy parameter and a second predetermined data privacy parameter, wherein the N is determined such that the intersection operation is differentially private given the first predetermined privacy parameter and the second predetermined data privacy parameter.

Aspect 10. The system of aspect 8 or aspect 9, wherein the up-sampled first dataset is a union of the first dataset and the first N elements of the shuffled padding dataset.

Aspect 11. The system of any one of aspects 8-10, wherein the processor is to further: shuffle the up-sampled first dataset; transform the shuffled up-sampled first dataset using a transform scheme; and dispatch the transformed shuffled up-sampled first dataset.

Aspect 12. The system of any one of aspects 8-11, wherein the processor is to further: provide a second dataset, wherein an intersection of the padding dataset and the second dataset is empty; shuffle the padding dataset; up-sample the second dataset with a first N elements of the shuffled padding dataset.

Aspect 13. The system of aspect 12, wherein the processor is to further: shuffle the up-sampled second dataset; transform the shuffled up-sampled second dataset using the transform scheme; and dispatch the transformed shuffled up-sampled second dataset.

Aspect 14. The system of aspect 13, wherein the processor is to further: shuffle the transformed shuffled up-sampled second dataset; and transform the shuffled transformed shuffled up-sampled second dataset using the transform scheme; wherein the received dataset is the transformed shuffled transformed shuffled up-sampled second dataset.

Aspect 15. A non-transitory computer-readable medium having computer-executable instructions stored thereon that, upon execution, cause one or more processors to perform operations comprising: providing a first dataset; determining a number N based on a data privacy configuration; generating a padding dataset; shuffling the padding dataset; up-sampling the first dataset with a first N elements of the shuffled padding dataset; performing an intersection operation based on the up-sampled first dataset and a received dataset.

Aspect 16. The computer-readable medium of aspect 15, wherein the data privacy configuration includes a first predetermined privacy parameter and a second predetermined data privacy parameter, wherein the N is determined such that the intersection operation is differentially private given the first predetermined privacy parameter and the second predetermined data privacy parameter.

Aspect 17. The computer-readable medium of aspect 15 or aspect 16, wherein the up-sampled first dataset is a union of the first dataset and the first N elements of the shuffled padding dataset.

Aspect 18. The computer-readable medium of any one of aspects 15-17, the operations further comprise: shuffling the up-sampled first dataset; transforming the shuffled up-sampled first dataset using a transform scheme; and dispatching the transformed shuffled up-sampled first dataset.

Aspect 19. The computer-readable medium of any one of aspects 15-18, the operations further comprise: providing a second dataset, wherein an intersection of the padding dataset and the second dataset is empty; shuffling the padding dataset; up-sampling the second dataset with a first N elements of the shuffled padding dataset.

Aspect 20. The computer-readable medium of aspect 19, the operations further comprise: shuffling the up-sampled second dataset; transforming the shuffled up-sampled second dataset using the transform scheme; and dispatching the transformed shuffled up-sampled second dataset.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A method comprising:
    determining a number N based on a differentially privacy configuration;
    generating a padding dataset having 2N elements;
    shuffling the padding dataset for a first dataset to obtain a shuffled padding dataset for the first dataset, and up-sampling the first dataset to obtain an up-sampled first dataset that comprises a first N elements of the shuffled padding dataset for the first dataset;

independently shuffling the padding dataset for a second dataset to obtain a shuffled padding dataset for the second dataset, and up-sampling the second dataset to obtain an up-sampled second dataset that comprises a first N elements of the shuffled padding dataset for the second dataset;

performing a private set intersection operation to obtain an intersection based on the up-sampled first dataset and the up-sampled second dataset; and computing a function over the intersection without revealing to another party the intersection explicitly to protect membership privacy for the first dataset and the second dataset, wherein the number N is determined such that the private set intersection operation is differentially private.

2. The method of claim 1, further comprising:
    shuffling the up-sampled first dataset to obtain a shuffled up-sampled first dataset; and
    transforming the shuffled up-sampled first dataset for a first party to obtain a transformed shuffled up-sampled first dataset.

3. The method of claim 2, further comprising:
    shuffling the transformed shuffled up-sampled first dataset to obtain a shuffled transformed shuffled up-sampled first dataset; and
    transforming the shuffled transformed shuffled up-sampled first dataset for a second party to obtain a transformed shuffled transformed shuffled up-sampled first dataset.

4. The method of claim 3, further comprising:
    shuffling the up-sampled second dataset to obtain a shuffled up-sampled second dataset; and
    transforming the shuffled up-sampled second dataset for the second party to obtain a transformed shuffled up-sampled second dataset.

5. The method of claim 4, further comprising:
    shuffling the transformed shuffled up-sampled second dataset to obtain a shuffled transformed shuffled up-sampled second dataset; and
    transforming the shuffled transformed shuffled up-sampled second dataset for the first party to obtain a transformed shuffled transformed shuffled up-sampled second dataset.

6. The method of claim 5, wherein the private set intersection operation is performed based on the transformed shuffled transformed shuffled up-sampled first dataset for the second party and the transformed shuffled transformed shuffled up-sampled second dataset for the first party.

7. The method of claim 1, wherein the differentially privacy configuration includes a first parameter and a second parameter, and
    the number N is determined such that the private set intersection operation is differentially private based on the first parameter and the second parameter.

8. The method of claim 1, wherein the up-sampled first dataset is a union of the first dataset and the first N elements of the shuffled padding dataset for the first dataset.

9. A system comprising:
    at least one memory to store a first dataset;
    at least one processor to:
        determine a number N based on a differentially privacy configuration;
        generate a padding dataset having 2N elements;

shuffle the padding dataset for the first dataset to obtain a shuffled padding dataset for the first dataset, and up-sample the first dataset to obtain an up-sampled first dataset that comprises a first N elements of the shuffled padding dataset for the first dataset;

independently shuffle the padding dataset for a second dataset to obtain a shuffled padding dataset for the second dataset, and up-sample the second dataset to obtain an up-sampled second dataset that comprises a first N elements of the shuffled padding dataset for the second dataset;

perform a private set intersection operation to obtain an intersection based on the up-sampled first dataset and the up-sampled second dataset; and compute a function over the intersection without revealing to another party the intersection explicitly to protect membership privacy for the first dataset and the second dataset, wherein the number N is determined such that the private set intersection operation is differentially private.

10. The system of claim 9, wherein the at least one processor is to further:

shuffle the up-sampled first dataset to obtain a shuffled up-sampled first dataset; and transform the shuffled up-sampled first dataset for a first party to obtain a transformed shuffled up-sampled first dataset.

11. The system of claim 10, wherein the at least one processor is to further:

shuffle the transformed shuffled up-sampled first dataset to obtain a shuffled transformed shuffled up-sampled first dataset; and transform the shuffled transformed shuffled up-sampled first dataset for a second party to obtain a transformed shuffled transformed shuffled up-sampled first dataset.

12. The system of claim 11, wherein the at least one processor is to further:

shuffle the up-sampled second dataset to obtain a shuffled up-sampled second dataset; and transform the shuffled up-sampled second dataset for the second party to obtain a transformed shuffled up-sampled second dataset.

13. The system of claim 12, wherein the at least one processor is to further:

shuffle the transformed shuffled up-sampled second dataset to obtain a shuffled transformed shuffled up-sampled second dataset; and transform the shuffled transformed shuffled up-sampled second dataset for the first party to obtain a transformed shuffled transformed shuffled up-sampled second dataset.

14. The system of claim 13, wherein the private set intersection operation is performed based on the transformed shuffled transformed shuffled up-sampled first dataset for the second party and the transformed shuffled transformed shuffled up-sampled second dataset for the first party.

15. A non-transitory computer-readable medium having computer-executable instructions stored thereon that, upon execution, cause one or more processors to perform operations comprising:

determining a number N based on a differentially privacy configuration;

generating a padding dataset having 2N elements;

up-sampling a first dataset to obtain an up-sampled first dataset that comprises a first N elements of the padding dataset shuffled for the first dataset;

up-sampling a second dataset to obtain an up-sampled second dataset that comprises a first N elements of the padding dataset independently shuffled for the second dataset;

performing a private set intersection operation to obtain an intersection based on the up-sampled first dataset and the up-sampled second dataset; and computing a function over the intersection without revealing to another party the intersection explicitly to protect membership privacy for the first dataset and the second dataset, wherein the number N is determined such that the private set intersection operation is differentially private.

16. The computer-readable medium of claim 15, the operations further comprise:

shuffling the up-sampled first dataset to obtain a shuffled up-sampled first dataset; and transforming the shuffled up-sampled first dataset for a first party to obtain a transformed shuffled up-sampled first dataset.

17. The computer-readable medium of claim 16, the operations further comprise:

shuffling the transformed shuffled up-sampled first dataset to obtain a shuffled transformed shuffled up-sampled first dataset; and transforming the shuffled transformed shuffled up-sampled first dataset for a second party to obtain a transformed shuffled transformed shuffled up-sampled first dataset.

18. The computer-readable medium of claim 17, the operations further comprise:

shuffling the up-sampled second dataset to obtain a shuffled up-sampled second dataset; and transforming the shuffled up-sampled second dataset for the second party to obtain a transformed shuffled up-sampled second dataset.

19. The computer-readable medium of claim 18, the operations further comprise:

shuffling the transformed shuffled up-sampled second dataset to obtain a shuffled transformed shuffled up-sampled second dataset; and transforming the shuffled transformed shuffled up-sampled second dataset for the first party to obtain a transformed shuffled transformed shuffled up-sampled second dataset.

20. The computer-readable medium of claim 19, wherein the private set intersection operation is performed based on the transformed shuffled transformed shuffled up-sampled first dataset for the second party and the transformed shuffled transformed shuffled up-sampled second dataset for the first party.

*    *    *    *    *